United States Patent [19]

Iwamoto et al.

[11] Patent Number: 4,926,058
[45] Date of Patent: May 15, 1990

[54] IMAGE READING APPARATUS WITH BLOCK LIGHTING AND PULSING

[75] Inventors: Hirofumi Iwamoto, Machida; Tatsundo Kawai; Makoto Ogura, both of Hiratsuka; Katsumi Nakagawa, Kawasaki; Shinichi Seitoh, Atsugi; Noriyuki Kaifu, Hiratsuka, all of Japan

[73] Assignee: Canon Kabushiki Kaisha, Tokyo, Japan

[21] Appl. No.: 6,214

[22] Filed: Jan. 23, 1987

[30] Foreign Application Priority Data

Jan. 27, 1986 [JP] Japan .................................. 61-13789

[51] Int. Cl.$^5$ ............................................. H01J 40/14
[52] U.S. Cl. ................................. 250/578.1; 358/483
[58] Field of Search ................. 250/578; 358/482, 483, 358/494

[56] References Cited

U.S. PATENT DOCUMENTS 4,639,608  1/1987  Kuroda ............................. 250/578
4,658,303  4/1987  Nagano ............................. 358/483

FOREIGN PATENT DOCUMENTS 3235759  4/1983  Fed. Rep. of Germany .
3418366  5/1984  Fed. Rep. of Germany .

*Primary Examiner*—David C. Nelms
*Attorney, Agent, or Firm*—Fitzpatrick, Cella, Harper & Scinto

[57] ABSTRACT

An image reading apparatus in which a plurality of light sources are provided and the lights emitted from the light sources are incident on to photoelectric converting means from an object to be read, thereby reading an image of the object; and dividing the light sources into a plurality of blocks, for sequentially divisionally lighting on the light sources every block, and for lighting on, in a pulse-like manner, the light sources of the blocks which are not divisionally lit on.

1 Claim, 5 Drawing Sheets

IMAGE READING APPARATUS WITH BLOCK LIGHTING AND PULSING

BACKGROUND OF THE INVENTION

1. Field of the Invention

The present invention relates to an image reading apparatus in which a plurality of light sources are divisionally lit on every block and irradiate an object to be read, thereby reading an image of this object.

The image reading apparatus according to the invention is widely used as an input unit of an image input apparatus such as, for example, facsimile apparatus or digital copying apparatus, or of other image processing apparatus.

2. Related Background Art

In recent years, the facsimile apparatus, the input apparatus of characters, images, and the like ordinarily use an image reading sensor which is constituted by arranging photosensors using thin film semiconductor, CCDs (charge coupled devices), or the like along the whole width of an original. As a light source, on the other hand, an LED array which is constituted by arranging a number of LEDs is used in order to reduce the size and weight.

A thin film semiconductor made of amorphous silicon, Cds:Se, or the like is frequently used as the image reading sensor. Such a semiconductor itself has good photoconductive characteristics. However, in the case of reading an original image by the monotonous color light of the LEDs or the like, it is difficult to perform the image reading operation at a high speed because the light response speed of the sensor itself is slow. Further, in the image reading apparatus using the LED array, a large current needs to flow through the LEDs in order to obtain a large amount of light enough to read the image. This causes the light amount to be reduced due to an increase in temperature of and the deterioration of the LED array.

To prevent the foregoing problems, in the conventional image reading apparatus, light source lighting control as will be explained hereinbelow is performed.

First, FIG. 1 is a schematic constitutional diagram of an image input unit. In this diagram, a plurality of photo sensors 1 are arranged in an array form in such a manner that the optical axis of each photosensor 1 coincides with the optical axis of a lens array 2 of the refractive index distribution type. An LED array 3 irradiates the lights to a reading position P of an original 4 with light. The reflected lights passes through the lens array 2 and is focused onto the photosensor 1.

FIG. 2 is a schematic diagram showing an example of an arrangement of the photosensors 1 and LED array 3. As shown in the diagram, sensor cells $S_1$ to $S_{40}$ of the photosensor 1 are divided into sensor blocks $SB_1$ to $SB_4$, and the LED array 3 is divided into light source blocks 5 to 8.

The photosensor 1 and LED array 3 divided into a plurality of blocks in this manner are controlled at the timings shown in the timing chart of FIG. 3.

As shown in the sense timing in FIG. 3, the sensor blocks $SB_1$ to $SB_4$ of the photosensor 1 are sequentially driven on a block unit basis. The light source blocks 5 to 8 are also sequentially lit synchronously with the driving of the sensor blocks (the high level denotes the light-on and the low level indicates the light-off). As shown in the diagram, the light source blocks 5 to 8 are lit at the timings in such a manner that the half period of light-on times overlap each other.

Owing to such a light-on control, the light is incident on the photosensor 1 for a predetermined period of time before it performs the reading operation, so that the limitation of the reading speed due to the light response time can be eliminated. Further, since the LED array 3 is divisionally sequentially lit the increase in temperature is suppressed and the reduction of the light amount can be prevented.

However, in the image reading apparatus such as facsimile apparatus or the like having the image transmitting function, if an amount of information of the original is large, the conversion processing time in the modem increases and after one reading scanning time of the photosensor 1, it also takes a long time to transfer the image data.

To perform the lighting control at the timings shown in FIG. 3 in such a case, the period of time until the transfer is completed is ordinarily set to the waiting time until the reading operation is started. However, in the conventional image reading apparatus, the photosensor 1 is sometimes left in the dark for a long time. Consequently, there is such a problem that when the next main scanning operation is started, the photo current rises with a delay time and the output decreases.

SUMMARY OF THE INVENTION

It is an object of the present invention to provide an image reading apparatus with high reliability to solve the problem of the prior art.

In an image reading apparatus according to the present invention, a plurality of light sources are provided and the lights emitted from the light sources are irradiated onto photoelectric converting means through an object to be read, thereby reading the image of this object, wherein this apparatus has light-on control means for dividing the light sources into a plurality of blocks, for sequentially divisionally lighting the light sources every block, and for lighting, in a pulse-like manner, the light sources of the blocks which are not divisionally lit.

As mentioned above, since the light sources of the blocks which are not divisionally lit on are lit in a pulse-like manner, even if an amount of information of the object to be read is large and it takes a long time to transfer, it is possible to prevent the reduction of the output due to the delay of the leading time of the light response of the photoelectric converting means and the image can be read with the high reliability.

DETAILED DESCRIPTION OF THE PREFERRED EMBODIMENTS

An embodiment of the present invention will be described in detail hereinbelow with reference to the drawings.

Figure 1:
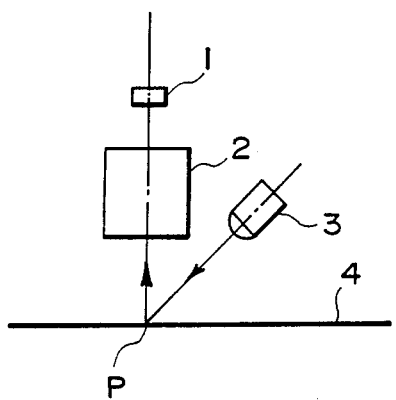
FIG. 1 is a schematic constitutional diagram of an image input unit.
Figure 2:
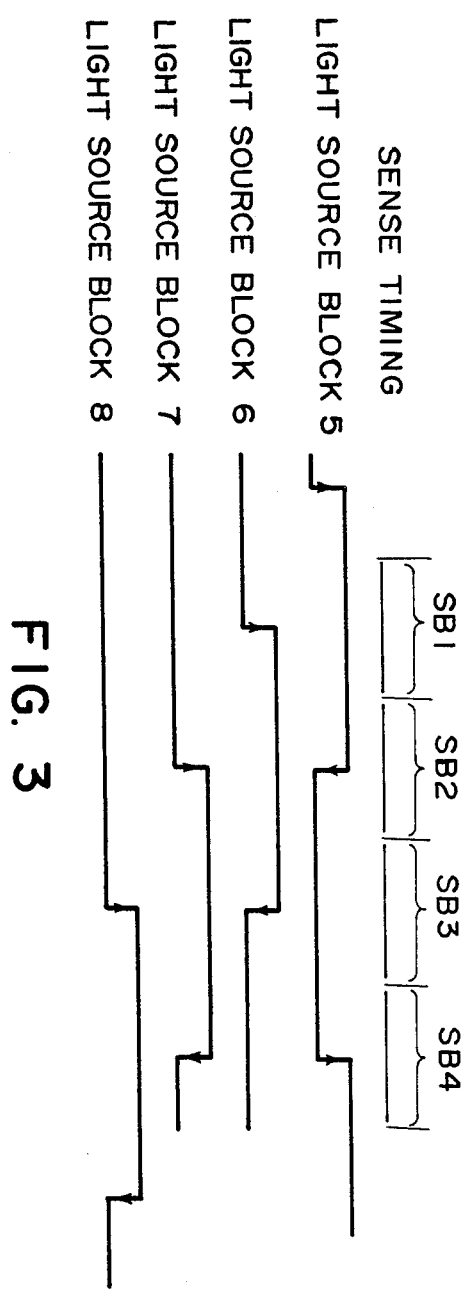
FIG. 2 is a schematic view showing an example of an arrangement of a photosensor 1 and an LED array 3.
Figure 3:
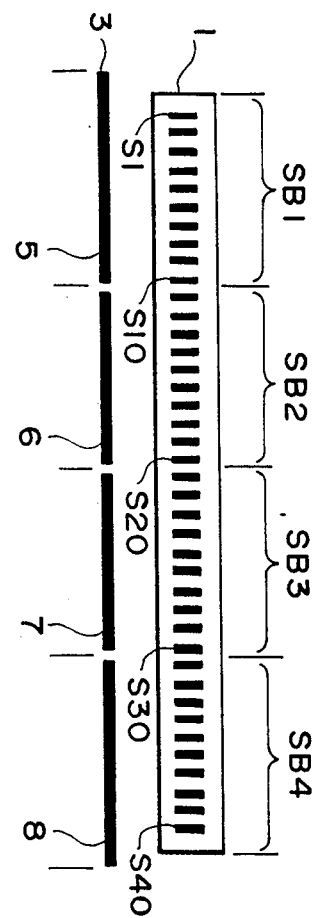
FIG. 3 is a timing chart showing the light-on control operation in a conventional image reading apparatus.
Figure 4:
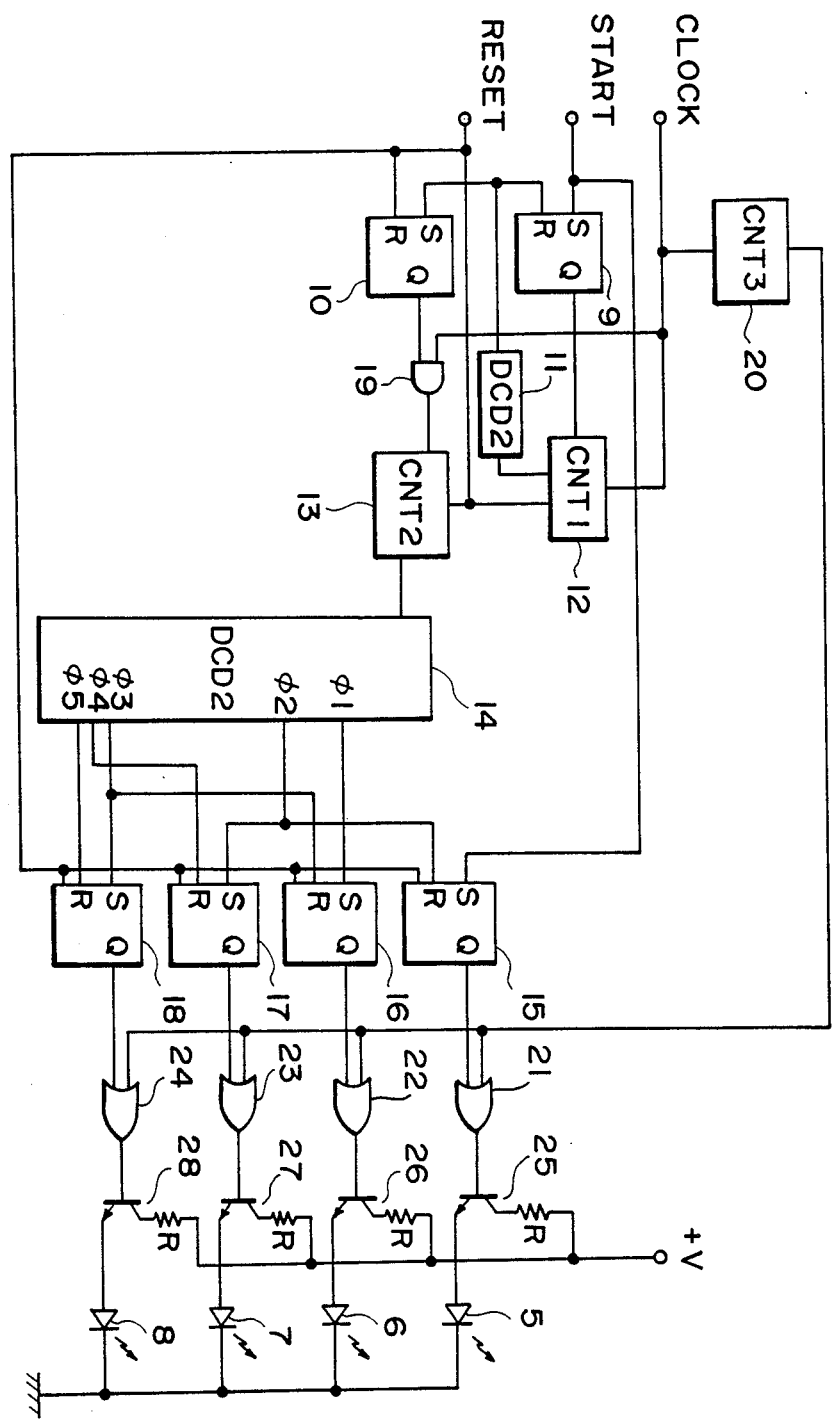
FIG. 4 is a block constitutional diagram of an embodiment of a light-on control apparatus in an image reading apparatus according to the invention.

FIG. 4 is a block constitutional diagram of an embodiment of a light-on control apparatus in an image reading apparatus according to the invention. In this embodiment, the image input unit shown in FIG. 1 is used and the photosensor 1 and LED array 3 are arranged in a manner similar to FIG. 2.

In FIG. 4, a fundamental clock pulse is input from a CLOCK terminal to counters 12 and 20 and an AND gate 19, respectively. In response to the fundamental clock pulse, the counter 20 outputs a pulse signal of a predetermined frequency to OR gates 21 to 24, respectively.

A reset pulse to newly start the light-on control of the light sources from the beginning is input from a RESET terminal. Counters 12 and 13 and flip-flops 10 and 15 to 18 are reset by the reset pulse. Each of the flip-flops 15 to 18 has a plurality of set or reset terminals.

A set pulse to start the light-on control of the light sources is input from a START terminal to the set terminals of the flip-flops 9 and 15, respectively. The output of the flip-flop 9 is input to the counter 12, thereby enabling the counter 12 to count. When a predetermined number of clock pulses are counted by the counter 12, the flip-flop 9 is reset and the flip-flop 10 is set through a decoder 11 by the output of the counter 12.

When the flip-flop 10 is set, the AND gate 19 is opened, so that the counter 13 starts counting the clock pulses. When the counter 13 counts a predetermined number of clock pulses, a decoder 14 is controlled on the basis of the count value. The flip-flops 15 to 18 are set or reset by five outputs of the decoder 14. Namely, the flip-flop 16 is set by the output $\phi_1$ of the decoder 14. The flip-flop 15 is reset and the flip-flop 17 is set by the output $\phi_2$. On the other hand, the flip-flop 16 is reset and the flip-flop 18 is set by the output $\phi_3$. The flip-flop 17 is reset by the output $\phi_4$. Further, the flip-flop 18 is reset by the output $\phi_5$.

The output terminals of the flip-flops 15 to 18 are connected to the input terminals of the OR gates 21 to 24, respectively. The output terminals of the OR gates 21 to 24 are connected to the base terminals of transistors 25 to 28, respectively. A power source voltage +V is applied to each collector terminal through a register R. The emitter terminals are grounded through the light source blocks 5 to 8 of the LED array 3, respectively. Therefore, the light source blocks 5 to 8 are turned on or off by the outputs of the OR gates 21 to 24, respectively.

The operation of the light-on control apparatus in the embodiment having the foregoing constitution will now be described with reference to FIG. 5.

Figure 5:
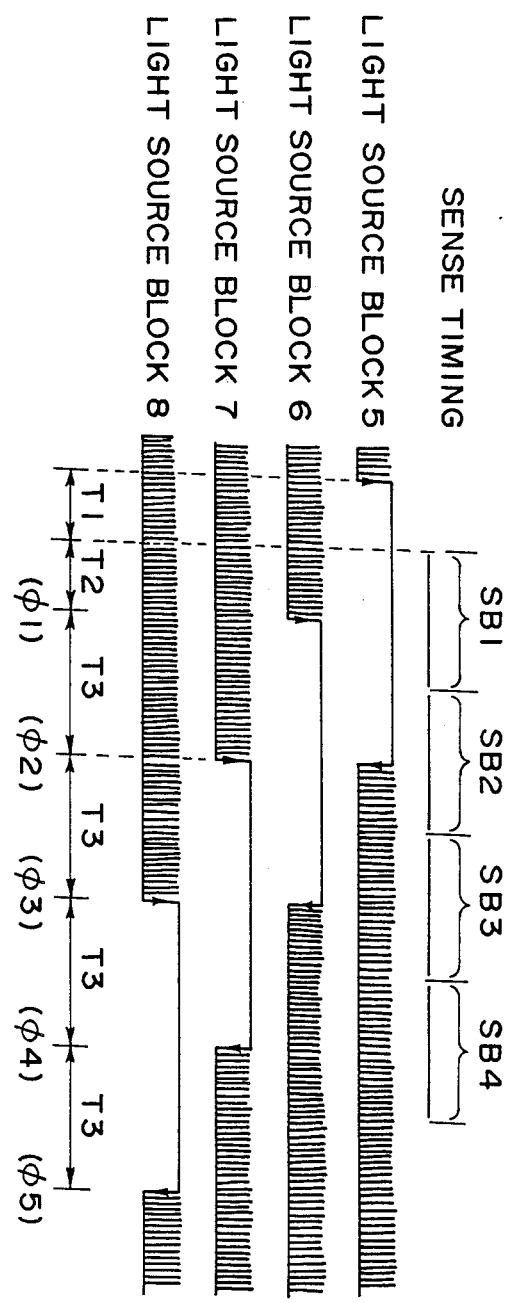
FIG. 5 is a timing chart showing the light-on control in the embodiment.

FIG. 5 is a timing chart showing the light-on control in the embodiment.

First, when the counter 20 outputs the pulse of a predetermined frequency, all of the light source blocks 5 to 8 are simultaneously lit in a periodic pulse-like manner (hereinafter, referred to as a cycle light-on) (for example, the period is 40 μsec, the light-on time is 8 μsec, and the like).

To newly start the light-on control of the light sources in order to read the image, a reset pulse is input from the RESET terminal, thereby resetting the flip-flops and the counters.

When a start pulse is input from the START terminal, the flip-flop 9 is set and the counter 12 is set to the count enable state. The flip-flop 15 is also set, a high-level signal is output from the OR gate 21, and the light source block 5 is lit on in a DC (Direct Current) manner. Such a DC manner light-on operation is continued for only the period of time (e.g., 4 msec) corresponding to the sense timings of the sensor blocks $SB_1$ to $SB_4$ and is sequentially executed every light source blocks for blocks 5 to 8 in response to the sense timings. Therefore, this DC manner light-on operation is referred to as the divisional light-on operation hereinafter.

When the counter 12 counts the clock pulses corresponding to the time $T_1$ until the sense timing of the sensor block $SB_1$, the counter 12 resets the flip-flop 9 and sets the flip-flop 10 through the decoder 11, respectively. When the flip-flop 10 is set, the AND gate 19 is opened, so that the counter 13 starts counting the clock pulses.

When the counter 13 counts the clock pulses corresponding to the time $T_2$, the decoder 14 sets the flip-flop 16 by the output $\phi_1$ on the basis of the count value of the counter 13. Thus, the light source block is divisionally lit on by the transistor 26 through the OR gate 22. As shown in the diagram, it is desirable to set the divisional light-on timing of the light source block 6 to the point when the scanning position of the original reaches the middle position of the sensor block $SB_1$.

Subsequently, when the counter 13 further counts the clock pulses corresponding to the time $T_3$ from the divisional light-on of the light source block 6 until the scanning position reaches the central position of the sensor block $SB_2$, the decoder 14 resets the flip-flop 15 and sets the flip-flop 17 by the output $\phi_2$ on the basis of the count value of the counter 13. Thus, the light source block 5 stops the divisional light-on operation and starts the cycle light-on operation. The light source block 7, on the contrary, stops the cycle light-on operation and starts the divisional light-on operation. At this time, since the flip-flop 16 is held in the set state, the light source block 6 is held in the divisional light-on state.

Subsequently, when the counter 13 further counts the clock pulses corresponding to the time $T_3$, the decoder 14 resets the flip-flop 16 and sets the flip-flop 18 by the output $\phi_3$. Thus, the light source block 6 starts the cycle light-on operation and the light source block 8 starts the divisional light-on operation. The light source block 7 continues the divisional light-on operation.

Next, when the counter 13 further counts the clock pulses corresponding to the time $T_3$, the decoder 14 resets the flip-flop 17 by the output $\phi_4$. The light source block 7 starts the cycle light-on operation and the light source block 8 continues the divisional light-on operation.

When the counter 13 further counts the clock pulses corresponding to the time $T_3$, the decoder 14 resets the flip-flop 18 by the output $\phi_5$, so that the light source block 8 starts the cycle light-on operation.

Thus, all of the light source blocks 5 to 8 are in the cycle light-on state. After completion of the transfer of the read information of the photosensor, a reset pulse is input from the RESET terminal and a start pulse is then input from the START terminal. The light source blocks are sequentially lit every block as previously explained above.

Figure 6:
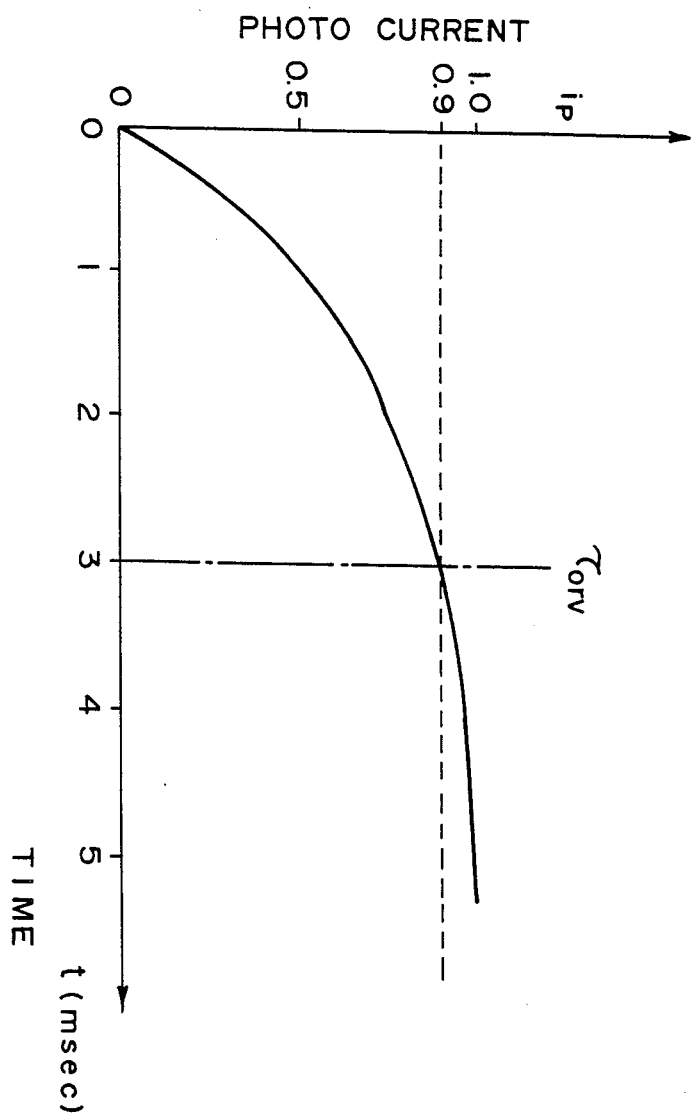
FIG. 6 is a graph showing the leading characteristic of a photosensor which is used in the embodiment.

FIG. 6 is a graph showing the leading characteristic of the photosensor which is used in the embodiment. The graph shows a change in photo current ip flowing through the photosensor from the start of the irradiation of a predetermined amount of light onto the photosensor to which a predetermined voltage was applied. Assuming that the current value upon saturation is 1, the time from the start (t=0) of the irradiation until the value of photo current reaches 0.9 is set to the leading time of the light response.

Figure 7:
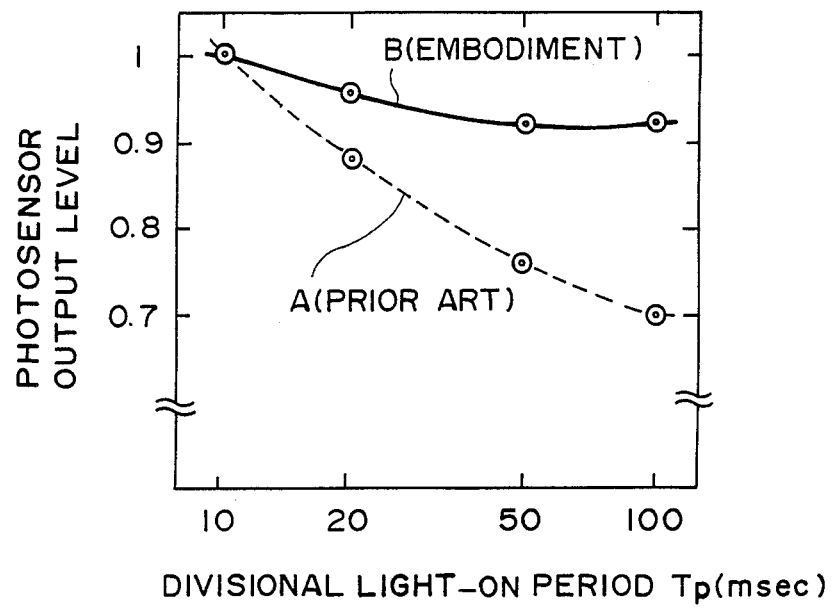
FIG. 7 is a graph for comparing the output levels of photosensors in the case where the light-on control of the light sources in the embodiment is performed using the photosensor having the light response characteristic shown in FIG. 6 and in the conventional case.

FIG. 7 is a graph showing the result of the comparison of the output levels of the photosensor in the case where the light-on control of the light sources of the embodiment is performed using the photosensor having the light response characteristic shown in FIG. 6 and in the conventional case. In this graph, the output level of the photosensor is set to "1" when the divisional light-on period Tp is 10 msec. The divisional light-on period Tp of the light sources changes in dependence on the transfer time after completion of one reading scanning operation of the photosensor. However, even if the period of time Tp is long, according to the embodiment in which the cycle light-on operation is performed, the degree of reduction of the photosensor output is very small as compared with the conventional case as shown in the curve B.

As described above, according to the embodiment, the cycle light-on operations of the light sources are also executed even when the photosensor does not perform the reading operation. Therefore, the problem in the conventional apparatus wherein the photosensor output decreases at the start of the next main scanning operation even if the transfer time after the reading scanning operation of the photosensor is long does not occur.

On the other hand, since the light sources are divided into a plurality of blocks and are lit every block, the amount of heat generation of the light source can be suppressed and the deterioration of the LED can be prevented.

Further, since the cycle light-on and divisional light-on operations can be provided by single light source, the heat generation and electric power consumption can be reduced. The heat radiating means which has conventionally been needed can be omitted. The light source portion can be minimized. The whole size of apparatus can be reduced, In the foregoing embodiment, the light sources and photosensors have been divided into four blocks for convenience of explanation, respectively. However, the number of divisional blocks is not limited to four.

For example, it is also possible to increase the number of divisional blocks of the photosensors and to operate these blocks by a well-known matrix driving method.

As described in detail above, according to the image reading apparatus of the embodiment, the light sources of the blocks which are not divisionally lit up are lit on in a pulse-like manner. Therefore, even if an amount of information of an object to be read is large and it takes a long time to transfer, the reduction of the output by the delay of the leading time of the light response of the photoelectric converting means can be prevented. The image can be read with e high reliability.

On the other hand, since the single light source is used commonly for the different light-on controls in the reading and non-reading modes by the photoelectric converting means, the amount of heat generation of the light source is reduced and the deterioration of the light source is prevented. In addition, the size, weight, and cost of the whole apparatus can be reduced.

We claim:

1. An image reading apparatus in which a plurality of light sources are provided and the lights emitted from said light sources are incident on photoelectric converting means from an object to be read, thereby reading an image of the object, comprising:

light-on control circuitry for dividing said light sources into a plurality of blocks, for sequentially divisionally lighting on the light sources every block, and for lighting on, in a pulse-like manner, the light sources of the blocks which are not divisionally lit on.

* * * * *

UNITED STATES PATENT AND TRADEMARK OFFICE
CERTIFICATE OF CORRECTION

PATENT NO. : 4,926,058            Page 1 of 2

DATED : May 15, 1990

INVENTOR(S) : Hirofumi Iwamoto, et al.

It is certified that error appears in the above-identified patent and that said Letters Patent is hereby corrected as shown below:

[57] ABSTRACT:

Line 3, "to" should be deleted.

COLUMN 1:

Line 49, "the" should be deleted.

Line 50, "lights to" should be deleted.

Line 51, "lights" should read --light--.

COLUMN 2:

Line 1, "half period" should read --half periods--.

Line 8, "lit the" should read --lit, the--.

Line 44, "lit on" should read --lit--.

Line 50, "the" should be deleted.

COLUMN 4:

Line 13, "blocks" should read --block--.

UNITED STATES PATENT AND TRADEMARK OFFICE
CERTIFICATE OF CORRECTION

PATENT NO. : 4,926,058

DATED : May 15, 1990

INVENTOR(S) : Hirofumi Iwamoto, et al.

It is certified that error appears in the above-identified patent and that said Letters Patent is hereby corrected as shown below:

COLUMN 5:

Line 28, "curve B." should read --curve A.--.

COLUMN 6:

Line 17, "up" should read --on,--.

Line 23, "e" should be deleted.

Signed and Sealed this

Fourteenth Day of July, 1992

Attest:

DOUGLAS B. COMER

*Attesting Officer*    Acting Commissioner of Patents and Trademarks